United States Patent
Haubmann et al.

(10) Patent No.: US 8,363,152 B2
(45) Date of Patent: Jan. 29, 2013

(54) METHOD FOR FOCUSING THE SHOOTING LENS OF A MOTION PICTURE OR VIDEO CAMERA

(75) Inventors: Michael B. Haubmann, Vienna (AT); Fritz Gabriel Bauer, Purkersdorf (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 604 days.

(21) Appl. No.: 11/658,635

(22) PCT Filed: Jul. 27, 2005

(86) PCT No.: PCT/DE2005/001328
§ 371 (c)(1),
(2), (4) Date: Mar. 7, 2008

(87) PCT Pub. No.: WO2006/012859
PCT Pub. Date: Feb. 9, 2006

(65) Prior Publication Data
US 2008/0284899 A1   Nov. 20, 2008

(30) Foreign Application Priority Data
Jul. 27, 2004 (DE) .................. 10 2004 037 296

(51) Int. Cl.
*G03B 13/00* (2006.01)
*H04N 5/232* (2006.01)
(52) U.S. Cl. ...................................... 348/348; 348/345
(58) Field of Classification Search ........... 348/347, 348/348; 356/5.02, 5.04, 3.12; 396/58, 80, 396/124, 142
See application file for complete search history.

(56) References Cited

U.S. PATENT DOCUMENTS

| | | | | |
|---|---|---|---|---|
| 4,574,314 A | * | 3/1986 | Weinblatt | 348/345 |
| 4,584,704 A | * | 4/1986 | Ferren | 382/255 |
| 4,866,465 A | * | 9/1989 | Gallegos | 396/189 |
| 4,963,017 A | * | 10/1990 | Schneiter et al. | 356/3.06 |
| 5,076,686 A | * | 12/1991 | Preston | 352/140 |
| 5,082,362 A | * | 1/1992 | Schneiter | 356/3.03 |
| 5,096,289 A | | 3/1992 | Mogamiya et al. | |
| 5,336,899 A | * | 8/1994 | Nettleton et al. | 250/559.29 |
| 5,513,276 A | * | 4/1996 | Theodoracatos | 382/154 |
| 6,148,151 A | | 11/2000 | Bauer | |
| 6,161,933 A | | 12/2000 | Tschida et al. | |
| 6,734,900 B2 | * | 5/2004 | Mayhew | 348/207.11 |

(Continued)

FOREIGN PATENT DOCUMENTS

| CH | 500 504 | 12/1970 |
|---|---|---|
| DE | 42 05 397 A1 | 8/1993 |

(Continued)

OTHER PUBLICATIONS

DE-4205397-A1—Translation.*

(Continued)

*Primary Examiner* — Sinh Tran
*Assistant Examiner* — Jason Flohre
(74) *Attorney, Agent, or Firm* — Christie, Parker & Hale, LLP (57) ABSTRACT

A method for focusing the shooting lens of a motion picture or video camera onto a moving or stationary object, which is imaged on a monitor of a display instrument is provided.

30 Claims, 5 Drawing Sheets

U.S. PATENT DOCUMENTS

| | | | |
|---|---|---|---|
| 6,903,775 B2* | 6/2005 | Senda | 348/345 |
| 6,989,890 B2* | 1/2006 | Riegl et al. | 356/5.01 |
| 7,342,650 B2* | 3/2008 | Kern et al. | 356/5.02 |
| 2002/0003965 A1* | 1/2002 | Landelle et al. | 396/661 |
| 2003/0193658 A1 | 10/2003 | Uomori et al. | |
| 2006/0061753 A1* | 3/2006 | Harris et al. | 356/4.05 |

FOREIGN PATENT DOCUMENTS

| | | |
|---|---|---|
| DE | 4205397 A1 * | 8/1993 |
| DE | 196 29 484 A1 | 1/1998 |
| EP | 0 574 105 A1 | 12/1993 |
| EP | 0 575 022 B1 | 12/1993 |
| EP | 0 942 305 A1 | 9/1999 |

OTHER PUBLICATIONS

Vector Notation.*

International Search Report, dated Feb. 10, 2006, corresponding to PCT/DE2005/001328.

International Preliminary Report on Patentability for International Application No. PCT/DE2005/001328, dated Jan. 30, 2007, 7 pgs.

* cited by examiner

METHOD FOR FOCUSING THE SHOOTING LENS OF A MOTION PICTURE OR VIDEO CAMERA

CROSS-REFERENCE TO A RELATED APPLICATION

This application is a National Phase Patent Application of International Patent Application Number PCT/DE2005/001328, filed on Jul. 27, 2005, which claims priority of German Patent Application Number 10 2004 037 296.9, filed on Jul. 27, 2004.

BACKGROUND

The invention relates to a method for focusing the shooting lens of a motion picture or video camera and to a device for carrying out the method.

In order to adjust the image sharpness or to focus shooting images or shooting sequences, which are shot by a motion picture camera via a shooting lens, it is known to connect a sharpness setting instrument, which is operated manually by an image sharpness or camera assistant in order to unburden the cameraman, to the shooting lens. Either the sharpness setting instrument is connected mechanically to the lens ring for image sharpness adjustment of the shooting lens, or an electric motor-driven drive unit arranged in a horizontal or vertical arrangement on the shooting lens transmits a torque via a toothed pinion onto the outer teeth of the image sharpness lens ring for sharpness adjustment according to EP 0 575 022 B1.

At the same time, in EP 0 942 305 A1 a device coupled to the lens ring for determining the actual status of the lens ring position, which determines the real position of the lens ring relative to the lens and converts this into a measurement output signal, may be provided in conjunction with the drive unit for adjusting the position of the image sharpness lens ring.

According to EP 0 574 105 A1, the drive unit for image sharpness adjustment may be driven via a control system which comprises a plurality of motor units coupled to the lens rings of the shooting lens of a motion picture camera according to EP 0 575 022 B1 for zoom, focus and iris adjustment, into which position transducers are integrated, and one or more hand operating units with which both adjustment values and distance limits can be adjusted in analogue and/or electronic fashion. The motor units and the hand operating unit are connected together via a serial control and data bus.

As an alternative according to DE 196 29 484 A1, a connection may be established between the drive units and position transducers, coupled to the lens rings of the shooting lens of the motion picture camera, with one or more hand operating units for zoom, image sharpness and iris adjustment via wireless control and monitoring of camera functions and therefore for image sharpness adjustment, in which a camera-side control and acquisition unit is connected via line connections to the focus, zoom and iris drive unit and contains a radio modem, which transmits control signals to and receives them from a remote operating control unit. The user-side control unit comprises a hand wheel for focusing or image sharpness adjustment, which is backed by a scale on which the range limits for image sharpness adjustment can be set. A potentiometer connected to the hand wheel specifies absolute values as setpoint values for adjusting the image sharpness on the shooting lens, which are transmitted via the radio transmission link to the camera-side control and acquisition unit that adjusts the motor or drive unit connected to the image sharpness lens rings to the setpoint position specified by the user-side control unit for adjusting the image sharpness lens rings.

In the methods and devices cited above, the focusing or distance setting of the shooting lens is carried out manually by specifying a corresponding distance setpoint value, which is either measured by means of a tape measure or estimated for example with the aid of marking points surveyed before shooting.

Since manual focusing of a shooting lens is susceptible to error and can be carried out only with difficulty in special shooting situations, for example with very long or very short distances and with very fast image sharpness changes, DE 42 05 397 A1 discloses automatic focusing of a shooting lens in which an autofocus instrument acquires the distance between a shooting object and the motion picture camera by means of an ultrasound or laser rangefinder and sets the image sharpness, required for focusing the shooting image or shooting sequence, on the shooting lens of the motion picture camera.

Since the entire image content does not always lie at the focus when shooting a subject or a scene, the problem of aligning the distance measurement instrument at the object to be focused inside a shooting image arises in automatic focusing instruments.

SUMMARY

In an exemplary embodiment, the present invention provides a method for focusing the shooting lens of a motion picture or video camera, which allows exact focusing of the shooting lens onto a moving or stationary object in a shooting image while ensuring simple operability.

The solution according to an exemplary embodiment of the invention ensures easily operable, exact focusing of the shooting lens of a motion picture or video camera onto a moving or stationary object lying inside a shooting image.

The solution according to the invention uses at least one distance measurement instrument, which is aligned exactly at the object to be focused inside a shooting image and is optionally tracked. The alignment and tracking of the object to be focused is carried out by means of a display device reproducing the shooting image, on which the object to be focused is selected and the distance measurement instrument is aligned at the selected object and tracked. The distance measurement subsequently carried out by the distance measurement instrument is either displayed as a distance measurement value so that manual focusing can subsequently be carried out directly, via a cable connection or by radio transmission, or delivered as a setpoint value for automatically focusing the shooting lens of the camera by a corresponding adjustment of the shooting lens.

The distance measurement instrument is preferably aligned or tracked in relation to a predetermined alignment of the distance measurement instrument at the object as a function of the image angle of an imaging lens of the display instrument and the coordinates of the image of the object on the monitor of the display instrument.

When the user thus selects the object to be focused on the monitor of the display instrument then, via the indication of the image point and the known horizontal and vertical image angles of the imaging or shooting lens, it is possible to align or track the distance measurement instrument at the object to be focused, in order to determine an exact distance setpoint value or measurement value. The position of the image point is indicated, for example, by using a touch-screen monitor so that the object coordinates are specified by touching the monitor, by means of a PC mouse with which a marking can be applied over the image of the object to be focused on the monitor of the display instrument or of a PC, by electronic image processing, digital image processing or the like.

The imaging lens of the display instrument may coincide with the shooting lens of the motion picture camera, when the video signal of the image on the monitor is generated in a motion picture camera from a video signal which is extracted from the shooting beam path, or it may be arranged on the camera or the display instrument as an additional lens coinciding with the shooting lens in respect of focal length and imaging size. In a video camera, on the other hand, the imaging lens is usually formed by the shooting lens.

Since the distance measurement instrument must be fitted at a particular distance from the optical axis of the camera, this results in parallax errors which, owing to the not yet known distance of the shooting lens or the image plane of the camera from the object to be focused, particularly with small distances of the object to be focused from the camera, leads to false measurements that lead to inaccurate focusing and therefore to restricted use of the automatic measurement method.

In order to resolve this problem, in a further configuration of the method according to the invention the horizontal and vertical angle deviation of the object from the camera are calculated from the coordinates of the image of the object on the display instrument and delivered as setpoint values to the control instrument of an adjustment instrument holding the distance measurement instrument for aligning or tracking a measurement head of the distance measurement instrument.

The distance of the distance measurement instrument from the optical axis of the camera or from the shooting lens or the image plane of the camera can be taken into account by this measure, so that parallax errors can be excluded particularly in the near field.

The focus to be adjusted on the shooting lens is preferably determined from the distance of the shooting plane of the camera from the principal optical point of the shooting lens, data of the shooting lens such as image field curvature, correction factors and the like and the distance of the principal optical point of the shooting lens from the object to be focused, in that the vector directed from the principal optical point of the shooting lens to the object to be focused, and therefore the distance D from the shooting lens to the object to be focused, is calculated from the absolute value of the addition of a vector A directed from the shooting plane of the camera to the measurement point of the distance measurement instrument with a vector B directed from the shooting plane of the camera to the principal optical point of the shooting lens minus a vector C directed from the measurement point of the distance measurement instrument to the object to be focused, according to the equation $$D=|D|=|A+B-C|.$$

When the distance measurement instrument is thus arranged at a predetermined position on or with respect to the camera, then the aforementioned vectorial approach takes into account the distance of the distance measurement instrument from the optical axis of the camera and therefore excludes any parallax error.

With this form of determining the distance of the object to be focused from the optical axis of the camera, the length of the vector directed from the shooting plane of the camera to the principal optical point of the shooting lens is preferably determined from the data and the actual focusing value of the shooting lens.

The vector directed from the measurement point of the distance measurement instrument to the object to be focused is furthermore determined from the horizontal and vertical angle deviation of the object from the camera and the distance measurement value of the distance measurement instrument.

A preferred method for acquiring the object to be focused by means of the distance measurement instrument is characterized in that a straight line, on which the object to be focused lies, is determined from the horizontal and vertical angle deviation of the object from the camera and the image angle of the imaging lens of the display instrument and in that the distance measurement instrument is panned on a plane spanned by the straight line and the position of the measurement point of the distance measurement instrument and distance measurements are carried out until the object to be focused is found.

Since the measurement point of the distance measurement instrument need not necessarily lie at the intersection point of the panning axes of the adjustment instrument and the panning axes need not necessarily intersect, one alternative for acquiring the object to be focused consists in carrying out a corresponding coordinate transformation for correction, in which it is also possible that an individual surface is not obtained from the measurement point of the distance measurement instrument and the straight line, rather a rotation of this plane takes place about the straight line over the sampling region.

An advantageous refinement of the method according to the invention is characterized in that a plurality of distance measurement instruments are arranged at different positions, the measurement values of which are evaluated in relation to their distance from the camera.

This refinement of the solution according to the invention avoids problems caused by shadowing the measurement beam of the distance measurement instrument, in that the distance measurement of at least one distance measurement instrument can be carried out with an unshadowed measurement beam.

As an alternative or in addition, at least one distance measurement instrument may be arranged displaceably on a guide device so that, when the measurement beam is shadowed, a correct measurement and evaluation of the distance measurement can be carried out by displacing the position of the distance measurement instrument while simultaneously acquiring and taking into account the distance of the distance measurement instrument from the optical axis of the camera.

A smaller or larger change in the image angle occurring in all shooting lenses via the change of the distance setting can be assumed as known and taken into account by corresponding modeling, in order to avoid calculation errors. This may be done for example by a memory with correction factors, which are stored in the memory together with the image angles of the shooting lens varying as a function of the distance setting.

In the same way imaging errors of the shooting lens, such as cushion- or drum-shaped distortions, can be modeled and stored as correction factors in the memory.

A device for carrying out the method is characterized by
at least one distance measurement instrument arranged at a defined position on or with respect to the camera,
an adjustment instrument holding the distance measurement instrument and determining the alignment of the measurement beam of the distance measurement instrument and
a control unit having
a display instrument imaging the shooting image of the camera and
a data-processing instrument which, as a function of a user-defined object to be focused, delivers a control signal for aligning the adjustment instrument at the object and delivers a setpoint value for automatically focusing the shooting lens of the camera and/or displays a distance measurement value from the distance, determined by the distance measurement instrument, of the distance measurement instrument from the object to be focused.

The device according to the invention allows automatic focusing of the shooting lens of a motion picture or video camera and therefore avoids error-prone manual focus adjustment, while ensuring that the focusing is aligned at an object to be focused even inside an image content comprising a plurality of focal ranges.

The display instrument comprises a monitor on which a video image of the video camera or a video beam path split from the shooting beam path of the motion picture camera is imaged. In both variants, the image content of the shooting image of the camera is imaged on the monitor, so as to ensure that no deviations occur between the image acquired by the focusing instrument and the image to be shot by the camera.

The monitor is preferably designed as a touch-screen monitor so as to guarantee simple operation, in that simple selection and initiation of the adjustment device for tracking the distance measurement instrument is ensured by touching the object to be focused in the image content.

As an alternative, a marking movable by means of arrow keys or a PC mouse may be applied over the image of the object to be focused on the monitor of the display instrument or of a PC, or carried out by electronic image processing or digital image processing.

The adjustment instrument may consist either of a panning head which can be panned about at least two axes by means of electromechanical drives, in particular about a horizontal and vertical axis, or of an optoelectrical beam deflection system with tilting mirrors or galvanometers and/or prisms.

In a preferred exemplary embodiment, the distance measurement instrument consists of a laser rangefinder with a high measurement rate, preferably a measurement rate of greater than or equal to 200 Hz. As an alternative, distance measurement instruments designed as ultrasound or infrared rangefinders are possible.

In order to avoid exact focusing being impossible owing to shadowing of the measurement beam of the distance measurement instrument, in a refined embodiment of the invention the distance measurement instrument may be arranged in adjustable positioning with respect to the camera. In particular, the distance measurement instrument may be arranged on a guide device, preferably a linear rail, connected directly or indirectly to the camera, or positioned on a rotation system arranged around the shooting lens. A multi-part configuration of the measurement system with a separated measurement head is furthermore possible.

In addition or as an alternative, in order to avoid shadowing of the measurement beam, a plurality of distance measurement instruments may be arranged at different positions with respect to the camera and connected to a common or superordinate control unit.

In an arrangement with a plurality of distance measurement instruments, the measurement results of the individual distance measurement instruments are compared with one another and evaluated for tracking with the adjustment instrument or focusing of the shooting lens.

The shooting lens may be configured from a zoom lens and therefore with variable focal length and thus a variable image angle, and as a lens with a fixed focal length.

In order to carry out and evaluate the focusing measurements, the control unit contains a microprocessor which is connected to a memory for storing enterable distance data, correction data of the shooting lens which can be selected as a function of the shooting lens used, and parameters for coordinate transformation.

BRIEF DESCRIPTION OF THE DRAWINGS

The underlying concept of the invention will be explained in more detail with the aid of an exemplary embodiment represented in the figures, in which:

FIG. 2A—shows a second exemplary embodiment of the display instrument designed as hand operating apparatus.

DETAILED DESCRIPTION

Figure 1:
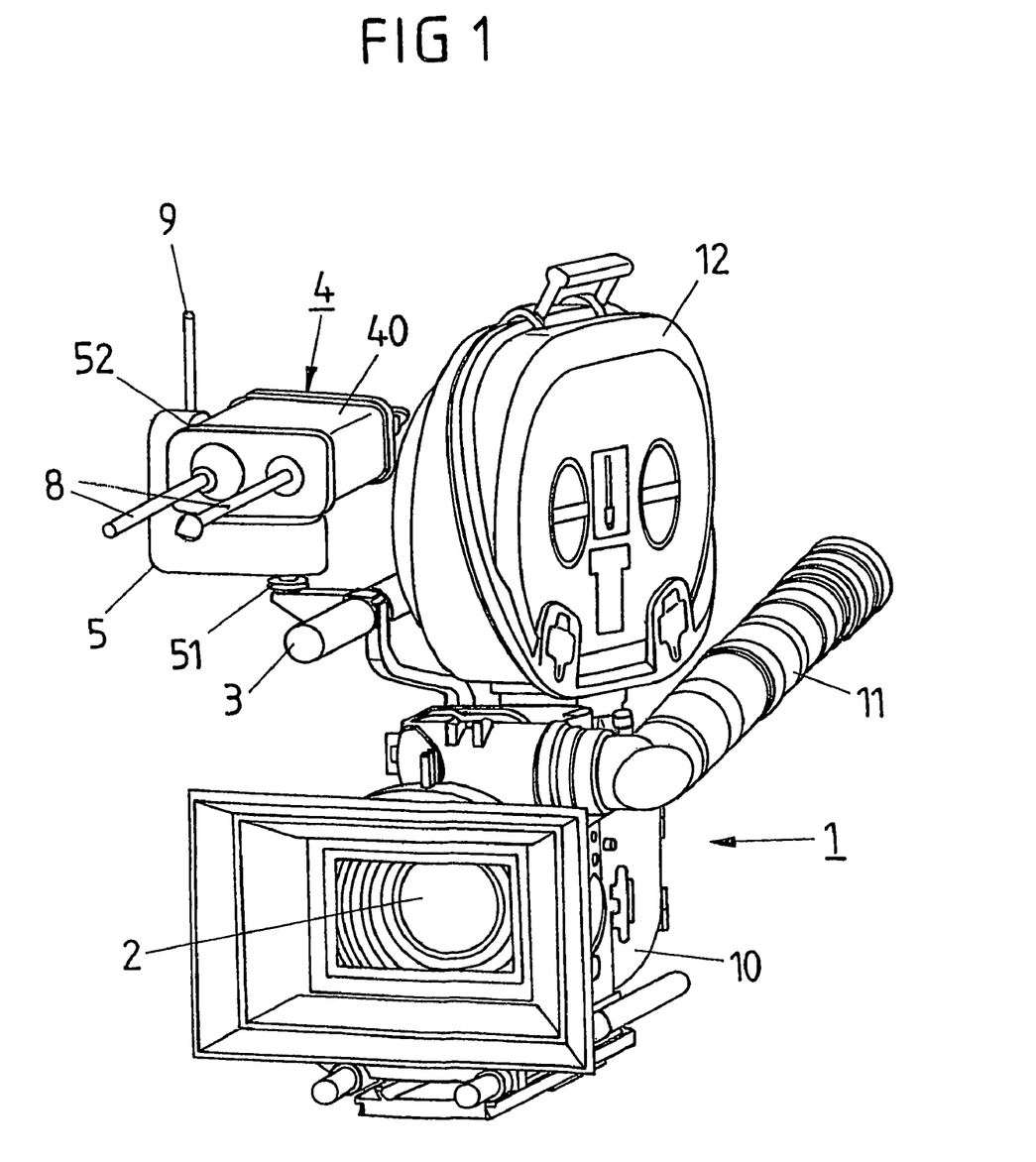
FIG. 1—shows a perspective representation of a motion picture camera with a distance measurement instrument connected to the camera via a panning head.

The motion picture camera 1 represented in perspective in FIG. 1 contains a camera body 10 with a film mechanism arranged therein for transporting a motion picture film, a viewfinder 11 and a film cassette 12 connected to the camera body 10. A shooting lens 2, which is directed at an object or subject to be shot, is arranged in the optical axis of the motion picture camera 1. The shooting lens 2 may be configured as a zoom lens of variable focal length, and accordingly variable image angle, or as a lens with a fixed focal length. The shooting lens 2 to be connected to a lens opening of the camera body 10, for example via a bayonet connection, may have a total of three lens rings via which it is possible to adjust the sharpness, the aperture of an iris and the focal length in the case of a zoom lens.

The shooting lens 2 is preferably adjusted via a control system for a shooting lens of a camera with one or more drive units for automatically adjusting positions of at least one lens ring, a predeterminable setpoint status of the lens ring or rings being adjustable via drive units. A device coupled to the lens ring or rings for determining the actual status of the lens ring position in this case determines the real position of the lens ring or rings relative to the shooting lens, and converts this into a measurement output signal. Such a control system is described for example in EP 0 942 305 A1.

A panning head 5 which holds a distance measurement instrument 4, for example in the form of a laser rangefinder, is additionally connected to the camera body 10 of the motion picture camera 1 via a frame and optionally via a handle 3. The panning head 5 has two panning axes 51, 52, of which the first panning axis 51 is arranged perpendicularly to the handle 3 so that the panning head 5 can be panned about this vertical axis 51 in a horizontal plane. The second panning axis 52 is arranged perpendicularly to the first panning axis 51 and holds a measurement head 40 of the distance measurement instrument 4, so that the measurement head can be panned about this horizontal axis. In conjunction with the first panning axis 51, this ensures that the distance measurement instrument can be adjusted about a horizontal and a vertical panning axis and is connected to the motion picture camera 1 in predetermined positioning.

In the case of a distance measurement instrument 4 designed as a laser rangefinder, the measurement head of the distance measurement instrument 4 emits a laser beam as a measurement beam 8 and receives the measurement beam 8 reflected by an object, from which the distance from the object to be shot to the motion picture camera 1 is determined. As an alternative, adjustment via tilting mirrors (galvanometers) or prisms is also conceivable.

Figure 2A:
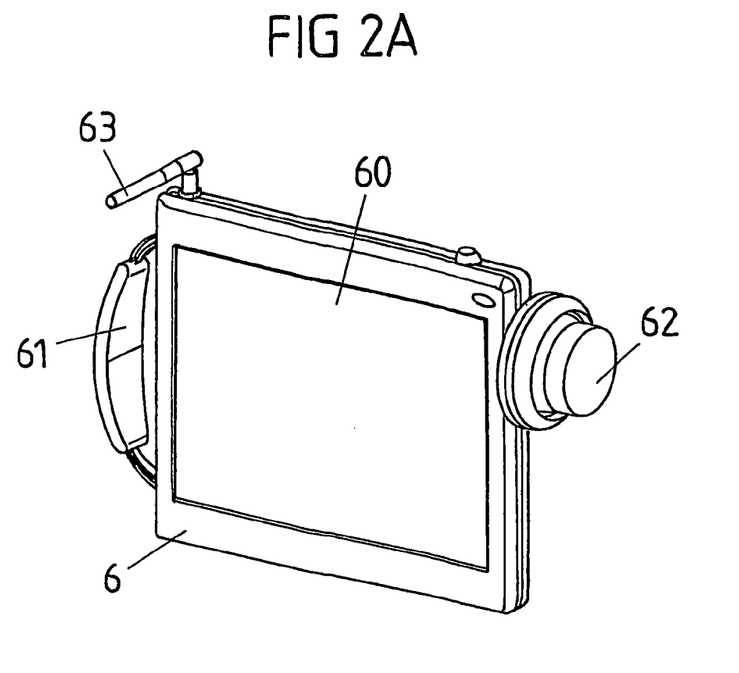
FIG. 2A—shows a first exemplary embodiment of the display instrument designed as hand operating apparatus.

An antenna 9 connected to the panning head 5 is used for transmitting data of the control system for the shooting lens 2 as well as of the distance measurement system and of the shooting image to hand operating apparatus arranged at a distance from the motion picture camera 1, where shooting parameters of the motion picture camera 1 can be adjusted and monitored by various operating persons. In order to focus the motion picture camera 1 at a moving or stationary object, a hand operating apparatus represented in perspective in FIG. 2A is used which consists of a display instrument 6 with a monitor 60, which is designed for example as a touch-screen monitor. The display instrument 6 comprises an adjustment knob 62 as well as a processor, which is connected via a signal amplifier to an antenna 63 for radio telecommunication of data to the antenna 9 on the panning head 5. To facilitate handling, a handle 61 is provided which makes it possible for a user to hold the display instrument 6 in one hand and make adjustments on the adjustment knob 62 with the other hand or to indicate an object to be focused by touching the monitor 60 at the position of the object in the image content represented on the monitor 60.

A video image, which is generated from a video beam path split from the shooting beam path of the motion picture camera 1, is represented on the monitor 60 so that the video image imaged on the monitor 60 corresponds to the shooting image of the motion picture camera 1. Since the entire image content imaged on the monitor 60 does not always lie at the focus of the shooting lens 2, the focus adjusted on the shooting lens 2 can be aligned at the object to be focused by touching the object to be focused on the touch-screen monitor 60.

As an alternative to using a touch-screen monitor, an optical instrument may be provided with which an optical designation is superimposed on the object to be focused.

Figure 2B:
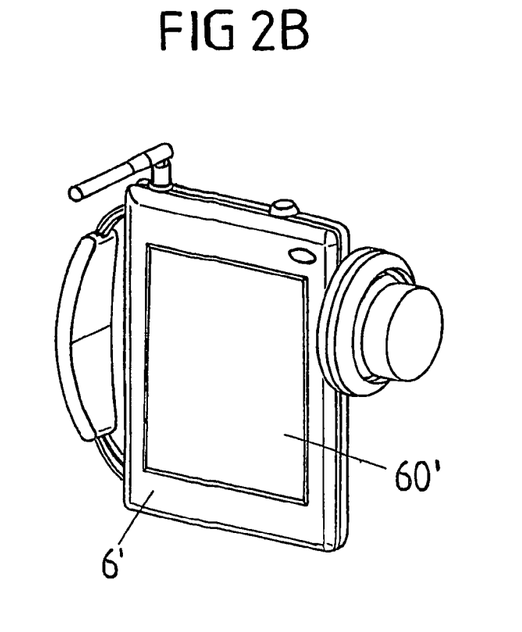

The hand operating apparatus represented in FIG. 2B, designed as a display instrument 6', corresponds to the hand operating apparatus according to FIG. 2A with different alignment and dimensioning of the monitor 60'.

Through selection of an object to be focused on the shooting lens 2 on the monitor 60 or 60' by indicating an image point denoting the object, the distance measurement instrument 4 according to FIG. 1 can be tracked in conjunction with the known image angles of the shooting lens 2, in order to determine a distance setpoint value by means of the measurement beam 8 emitted and received by the measurement head 40.

Figure 3:
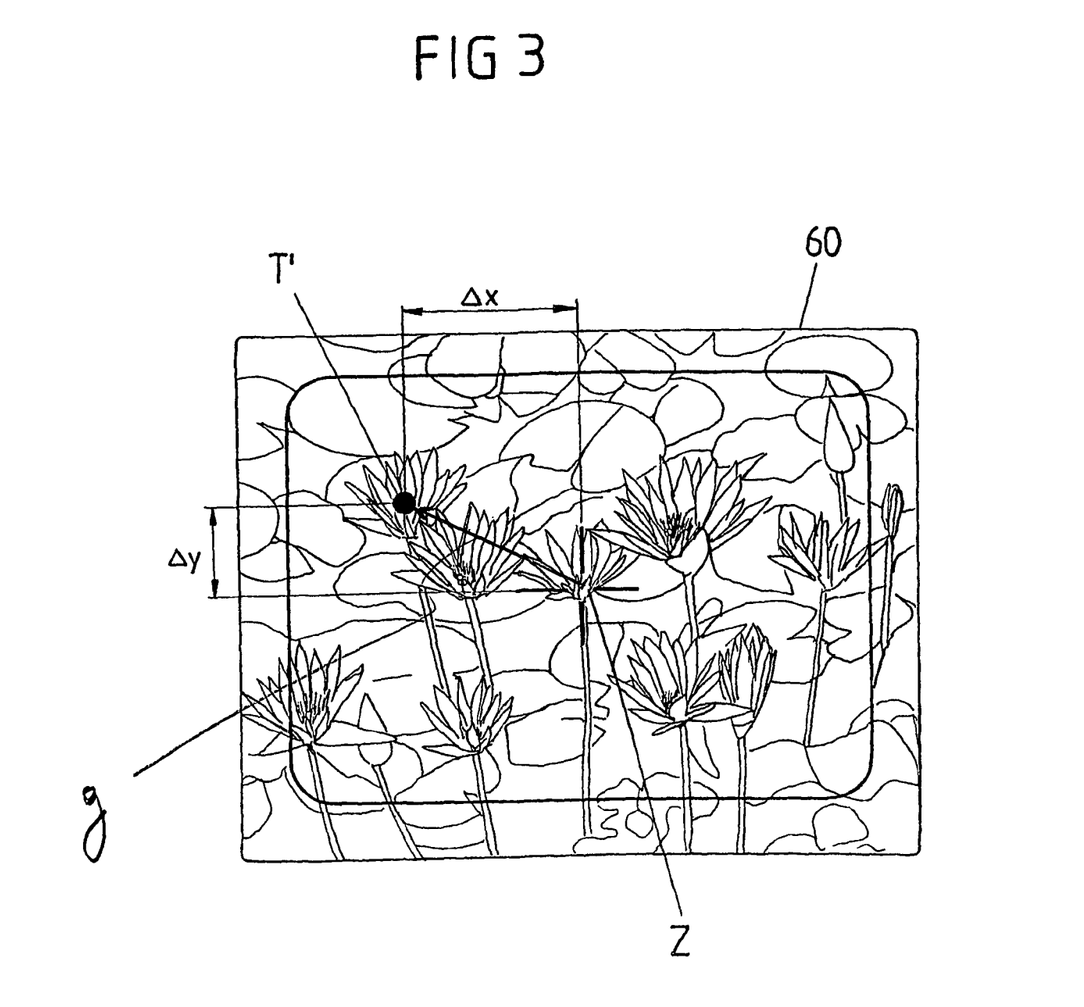
FIG. 3—shows a schematic representation of a shooting image imaged on the monitor of the display instrument for defining the position of a measurement point.

FIG. 3 schematically represents how a straight line g is defined from the indication of an image point T' of the object to be focused in the shooting image of the motion picture camera 1 according to FIG. 1, imaged on the monitor 60, from the coordinates Δx and Δy of the deviation of the image point T' from the center Z of the image content, which line is established by the two angles αX and αY derivable from the coordinates Δx and Δy. In conjunction with the known image angles of the shooting lens 2 the distance measurement device 4 is aligned at the object to be focused by corresponding panning of the panning head 5 about the horizontal and vertical panning axes 51, 52, in order to determine the distance setpoint value by activating the measurement head 40.

Yet since the distance measurement instrument 4 or the measurement head 40 of the distance measurement instrument 4 according to FIG. 1 is arranged at some distance from the optical axis of the motion picture camera 1, given by the center of the shooting lens 2, the distance measurement of the distance measurement instrument 4 results in a parallax error which, particularly in the near field, leads to considerable false measurements and therefore restricts the application of the focusing method. In order to be able to exclude such a parallax error, the method explained below with the aid of FIGS. 4 and 5 is used.

Figure 5:
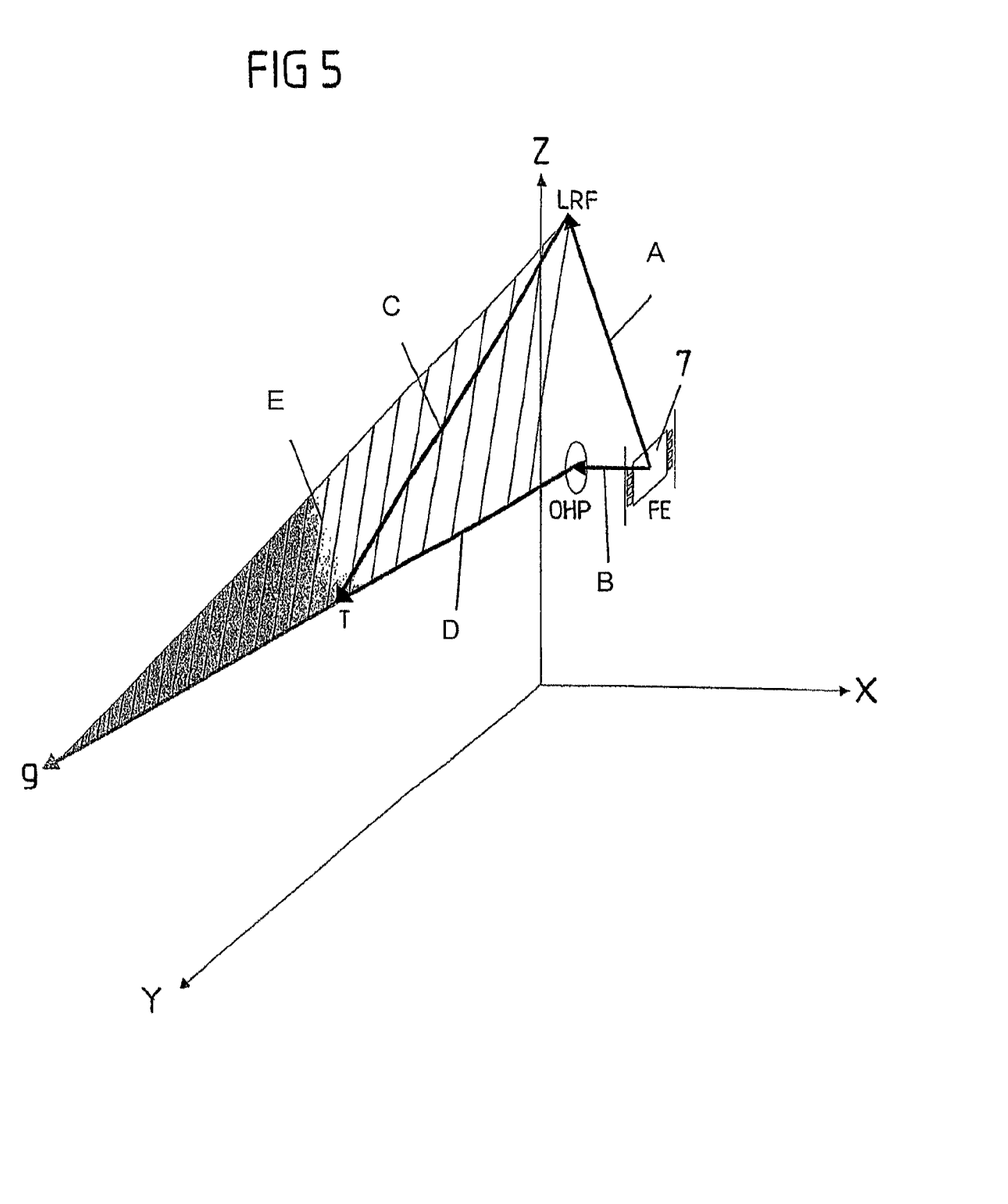
FIG. 5—shows a graphical representation for determining the distance of an object to be focused from the principal optical point of a shooting lens.

FIG. 5 shows a graphical representation of vectors A, B, C, D in a three-dimensional space determined by the axes X, Y and Z of a right-angled coordinate system.

Figure 4:
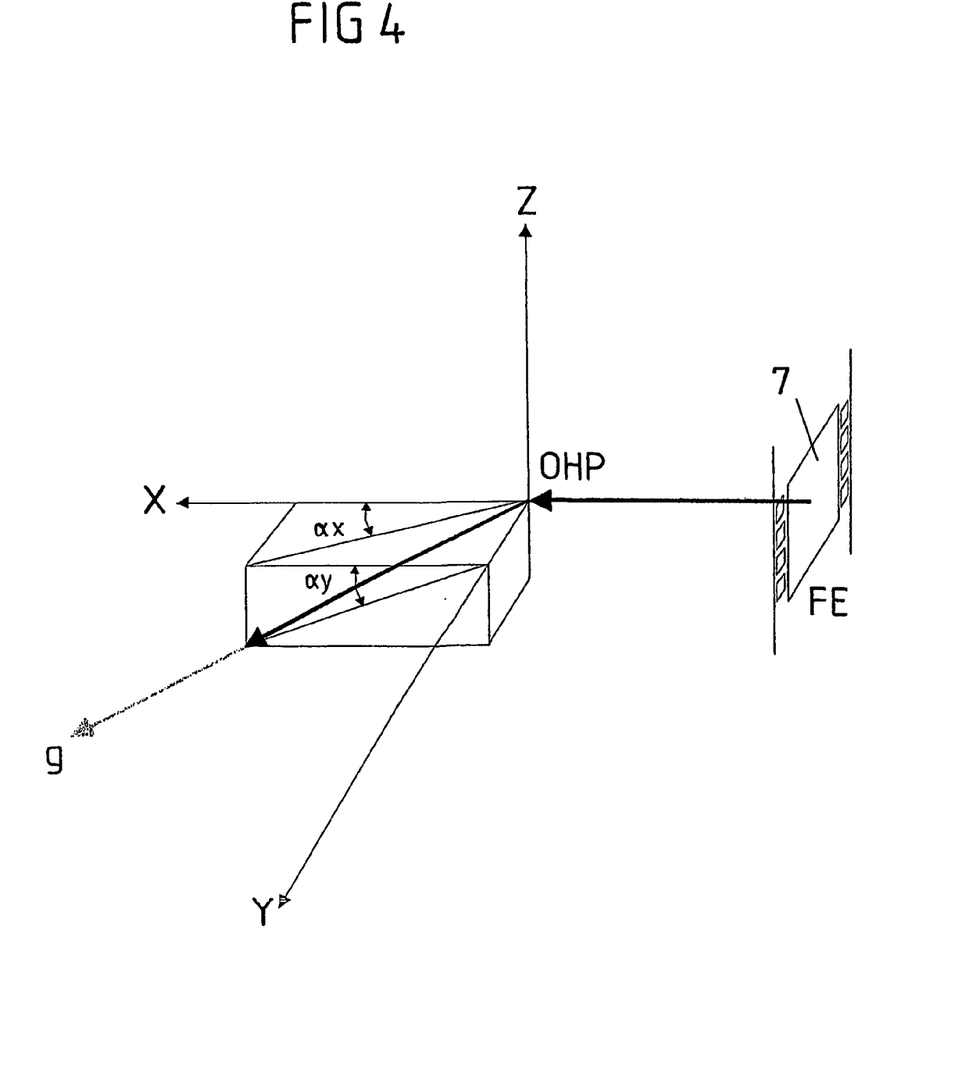
FIG. 4—shows a graphical representation of the definition of a straight line passing through the object to be focused.

Since the distance measurement instrument 4 according to FIG. 1 is fitted in a predetermined position on the motion picture camera 1 in this three-dimensional space, the distance of the measurement or reference point LRF of the distance measurement instrument 4 from the film plane FE of the motion picture film 7 according to FIGS. 4 and 5 is known and can be determined by a vector A.

The film plane FE of the motion picture film 7, which is positioned intermittently at an image window for film exposure in the camera body 10 according to FIG. 1, also lies in the three-dimensional space. By the known distance of the image window from the bayonet connection for fastening the shooting lens 2 and by the optical data of the respectively used shooting lens 2, the distance of the film plane FE from the principal optical point OHP of the shooting lens 2 is known, or at least an approximation value sufficient for the distance measurement is known. The connection between the film plane FE and the principal optical point OHP is accordingly defined by a vector B, the length of which is equal to the known distance of the film plane FE from the principal optical point OHP of the shooting lens 2, which can be determined from the data of the shooting lens 2 and the distance currently set at the shooting lens, i.e. the actual value of the focus. These data may in particular be obtained by a control system for the shooting lens of a camera corresponding to EP 0 942 305 A1.

The vector B in the graphical representation according to FIG. 5, which is directed from the film plane FE of the motion picture film 7 to the principal optical point OHP of the shooting lens 2, is therefore also uniquely known.

As already described above, by indicating the image of the object T to be focused on the image of the monitor as image point T', via the image angle of the imaging or shooting lens 2 as well as by the distances Δx and Δy of the image point T' from the center Z of the image, the straight line g according to FIG. 4 is determined, on which the object T to be focused must lie and which is determined by the two angles αx and αy and is calculated from the values Δx and Δy and the image angle of the shooting lens 2.

By the straight line g and the known position of the distance measurement instrument 4 in relation to the optical axis of the motion picture camera 1, a plane is defined which is represented by shading in the graphical representation according to FIG. 5. The measurement head 40 of the distance measurement instrument 4 is now panned in this plane E and, from a predetermined near point which is determined for example by the minimal distance to be focused, distance measurements are carried out in the plane E which is defined by the vector C according to FIG. 5 starting from the measurement point LRF of the distance measurement instrument 4.

To this end, the distance measurement instrument 4 is aligned at the plane E by means of the first axis 51 of the panning head 5 and the plane E is scanned by changing the panning angle of the second axis 52 of the panning head 5. As soon as the vector C according to FIG. 5, determined by the known panning angle of the panning head 5 holding the distance measurement instrument 4 and the respective measurement value of the distance measurement instrument 4, reaches a point on the straight line g, the object T to be focused is determined by the measurement beam 8 of the distance measurement instrument 4.

Since the vectors A, B and C according to FIG. 5 are thus known, the distance D of the object T to be focused from the principal optical point OHP can be determined from the magnitude of the vectors A, B, C according to the equation:

$$D=|D|=|A+C-B|.$$

Via the known data of the shooting lens 2, such as image field curvature, correction factors and the like, as well as the distance of the principal optical point OHP from the film plane FE of the motion picture film 7, it is subsequently possible to calculate the focus to be adjusted on the shooting lens 2.

In a preferred embodiment, a laser rangefinder with a high measurement rate of greater than or equal to 200 Hz is used as the distance measurement instrument. As an alternative, other measurement methods such as ultrasound or infrared measurements may also be used.

The invention claimed is:

1. A method for focusing a shooting lens of a motion picture or video camera onto a moving or stationary object said shooting lens being fastened to the camera at a known distance from a shooting plane of the camera, wherein a principal optical point of the shooting lens being determined by a known distance of the shooting lens from the shooting plane of the camera and by optical data and an actual focus value of the shooting lens, the method comprising:

imaging said object on a monitor of a display instrument with a distance measurement instrument which is connected to the camera in a predetermined position, wherein a measurement or reference point of the distance measurement instrument has a known distance from the shooting plane of the camera, said distance measurement instrument being aligned or tracked in relation to a predetermined alignment of the distance measurement instrument with the object as a function of an image angle of an imaging lens of the display instrument and coordinates of the image of the object on the monitor of the display instrument;

calculating horizontal and vertical angle deviations of the object from the camera from the coordinates of the image of the object on the monitor;

determining a straight line, on which the object to be focused lies, from the horizontal and vertical angle deviations of the object from the camera and the image angle of the imaging lens of the display instrument, said distance measurement instrument being panned on a plane spanned by the straight line and the position of the measurement or reference point of the distance measurement instrument for carrying out distance measurements until the object to be focused is found, determining the focus to be adjusted on the shooting lens based on the distance of the shooting plane of the camera from the principal optical point of the shooting lens, a distance of the principal optical point of the shooting lens from the object to be focused, wherein the distance of the principal optical point of the shooting lens from the object to be focused is determined from the equation $$D=|D|=|A+C-B|$$

wherein,

D is a vector directed from the principal optical point of the shooting lens to the object to be focused, and |D| is the magnitude of vector D, A is a vector directed from the shooting plane of the camera to a measurement point of the distance measurement instrument, B is a vector directed from the shooting plane of the camera to the principal optical point of the shooting lens, and C is a vector directed from the measurement point of the distance measurement instrument to the object to be focused, whereby parallax errors are excluded from said determination of said focus to be adjusted, wherein the length of the vector directed from the shooting plane of the camera to the principal optical point of the shooting lens is determined from the data and the actual focusing value of the shooting lens.

2. The method of claim 1, wherein horizontal and vertical angle deviations of the object from the camera are calculated from the coordinates of the image of the object on the monitor;

setpoint values being derived based on said calculated angle deviations;

said setpoint values being delivered to a control instrument of an adjustment instrument holding the distance measurement instrument for aligning or tracking a measurement head of the distance measurement instrument.

3. The method of claim 1, wherein the vector directed from the measurement point of the distance measurement instrument to the object to be focused is determined from the horizontal and vertical angle deviation of the object from the camera and distance measurement value of the distance measurement instrument.

4. The method of claim 1, wherein a coordinate transformation for correction is carried out in the event that the measurement point of the distance measurement instrument is not arranged at an intersection point of panning axes of the adjustment instrument and/or when the panning axes of the adjustment instrument do not intersect.

5. The method of claim 4, wherein a sampling distance for finding the object lies in a rotation of the plane spanned between the straight line and the position of the measurement point of the distance measurement instrument around the straight line.

6. The method of claim 1, wherein a plurality of distance measurement instruments are arranged at different positions, wherein the measurement values provided by said plurality of distance measurement instruments are evaluated in relation to their distance from the camera.

7. The method of claim 6, wherein at least one distance measurement instrument is arranged displaceably on a guide device.

8. The method of claim 1, wherein a change of the image angle resulting from a distance setting is taken into account for focusing the shooting lens onto the object.

9. The method of claim 1, wherein imaging errors of the shooting lens such as cushion- or drum-shaped distortions are taken into account for focusing the shooting lens onto the object.

10. The method of claim 8 or 9, further comprising a adjusting said calculated distance based on correction values from model calculations.

11. A device for focusing a shooting lens of a motion picture or video camera onto a moving or stationary object comprising:

at least one distance measurement instrument arranged at a defined position on or with respect to the camera;

an adjustment instrument holding the distance measurement instrument and determining the alignment of a measurement beam of the distance measurement instrument; and a control unit comprising, a display instrument imaging a shooting image of the camera, and a data-processing instrument which, as a function of a user-defined object to be focused, delivers a control signal for aligning the adjustment instrument at the object and delivers a setpoint value for automatically focusing the camera and/or displays a distance measurement value from the distance determined by the distance measurement instrument, of the distance measurement instrument from the object to be focused, said setpoint value being determined from the distance of a shooting plane of the camera from a principal optical point of the shooting lens, data of the shooting lens, and the distance of the principal optical point of the shooting lens from the object to be focused, determining the distance of the principal optical point of the shooting lens from the object to be focused is determined from the equation $$D=|D|=|A+C-B|$$

wherein,

D is a vector directed from the principal optical point of the shooting lens to the object to be focused, and D is the magnitude of vector D, A is a vector directed from the shooting plane of the camera to a measurement point of the distance measurement instrument, B is a vector directed from the shooting plane of the camera to the principal optical point of the shooting lens, and C is a vector directed from the measurement point of the distance measurement instrument to the object to be focused, whereby parallax errors are excluded from said determined setpoint value.

12. The device of claim 11, wherein the display instrument comprises a monitor on which a video image of the video camera or a video beam path split from a shooting beam path of the motion picture camera is imaged.

13. The device of claim 12, wherein the monitor is a touchscreen monitor.

14. The device of claim 12, wherein the display instrument comprises a monitor of a personal computer, on which a marking movable by means of arrow keys or a PC mouse is displayed.

15. The device of claim 11 or 12, further comprising means for image processing for determining the object to be focused.

16. The device of claim 11, wherein the display instrument comprises imaging lens coinciding with a shooting lens of the camera in which a video signal of an image on the monitor is generated from a video signal which is extracted from a shooting beam path.

17. The device of claim 11, wherein the display instrument comprises an imaging lens which is arranged on the camera or the display instrument as an additional lens coinciding with the shooting lens.

18. The device of claim 11, wherein the adjustment instrument a panning head which can be panned about at least two axes by means of electromechanical drives.

19. The device of claim 18, wherein the panning head is capable of panning at least about a horizontal and a vertical axis.

20. The device of claim 11, wherein the adjustment instrument comprises an optoelectrical beam deflection system with tilting mirrors or galvanometers or prisms.

21. The device of claim 11, wherein the distance measurement instrument comprises a laser rangefinder.

22. The device of claim 11, wherein the distance measurement instrument comprises an ultrasound or infrared rangefinder.

23. The device of claim 11, wherein the distance measurement instrument is adjustably arranged relative to the camera.

24. The device of claim 23, wherein the distance measurement instrument is arranged on a guide device connected directly or indirectly to the camera.

25. The device of claim 23, wherein the distance measurement instrument is arranged on a rotation system arranged around the shooting lens.

26. The device of claim 11, wherein a measurement head of the distance measurement instrument, delivering and receiving a measurement beam of the distance measurement instrument, is positionable separately from the distance measurement instrument.

27. The device of claim 11, wherein a plurality of distance measurement instruments are arranged at different positions with respect to the camera and are connected to a common or superordinate control unit.

28. The device of claim 11, wherein the shooting lens comprises a zoom lens with a variable focal length and a variable image angle.

29. The device of claim 11, wherein the shooting lens comprises a lens with a fixed focal length.

30. The device of claim 11, wherein the control unit comprises a microprocessor which is connected to a memory for storing enterable distance data, correction data of the shooting lens which can be selected as a function of the shooting lens, and parameters for coordinate transformation.

* * * * *

UNITED STATES PATENT AND TRADEMARK OFFICE
CERTIFICATE OF CORRECTION

PATENT NO. : 8,363,152 B2
APPLICATION NO. : 11/658635
DATED : January 29, 2013
INVENTOR(S) : Michael B. Haubman et al.

It is certified that error appears in the above-identified patent and that said Letters Patent is hereby corrected as shown below:

In the Claims

Column 10, Claim 10, line 62          Delete "a"

Column 12, Claim 18, lines 11 and 12   After "instrument"
                                        Insert -- comprises --

Signed and Sealed this
Eighteenth Day of February, 2014

Michelle K. Lee
*Deputy Director of the United States Patent and Trademark Office*